Patented July 23, 1929.

UNITED STATES PATENT OFFICE.

1,721,544

HUGH S. COOPER, OF CLEVELAND, OHIO, ASSIGNOR TO KEMET LABORATORIES COMPANY, INC., A CORPORATION OF NEW YORK.

PROCESS OF PRODUCING HIGH VACUA.

No Drawing. Application filed April 14, 1927. Serial No. 183,916.

The invention is a process for producing high vacua.

Very high vacua are desirable for many purposes, for example in the manufacture of tubes in which an electrical current is caused to flow between electrodes separated by an evacuated space. X-ray tubes are examples of such apparatus, but the commonest examples at this time are the thermionic tubes used for radio communication, telephone repeaters, etc. The invention is useful for producing vacua for any purpose.

Simple and inexpensive means, such as pumping, suffice to produce moderate vacua. In the manufacture of radio tubes, as now practiced, it is customary to place in the space to be evacuated and active absorbent for oxygen, nitrogen and water vapor and, after the principal part of the gas has been removed by pumping, to heat this absorbent, so that it will clean up as much as possible of the residual gas. My invention may be similarly applied, but it employs clean-up agents which surpass in activity any heretofore used, with the result that better vacua are attained. When the invention is used in the manufacture of thermionic tubes, the operating characteristics of the tubes are improved by the better vacua. Further improvements which will be described herein are also realized.

The invention comprises liberating within the space to be evacuated a chemical element capable of reacting with the residual gases to produce only solid products, and conducting the process so that this reaction occurs at the instant when the said element is released from its original combination. The nascent element, which may be one of the alkali or alkaline earth metals, preferably the latter, reacts with an intensity which would approach violence, except for the small quantities of materials involved. By the use of the invention it is possible to produce radio tubes with residual gas pressures of an order only one-twentieth as large as in the tubes now in general use.

I prefer to produce the nascent clean-up agent by an exothermic reaction initiated after the space has been pumped out and sealed off. The reaction mixture may consist of a reducible compound of an active getter element and a metal having a high heat of oxidation. The reducing metal may be, for example, aluminum, silicon or magnesium, and the reducible compound may be an oxide or peroxide of an alkali or alkaline earth metal. Auxiliary substances may be of course be used.

My best results thus far have been obtained with a mixture of barium oxide and magnesium, the materials being finely powdered and intimately mixed. The mixture may be placed in the space to be evacuated in any manner appropriate to the structure of the envelope and the members within the envelope. As applied to radio tubes I prefer to produce a compact pellet of suitable size from the reaction mixture, and to enclose this in a cage welded or otherwise attached to the plate so that the reaction mixture is freely accessible to the residual gas.

When the tube has been pumped out and sealed off it is placed in the field of a high frequency coil whereupon the plate is heated in a well-known manner by eddy currents induced in it, until the ignition point of the mixture is reached. Where the reaction to be brought about is not exothermic, more energy must of course be expended on the materials to bring about the desired degree of reaction.

With the Mg-BaO mixture the stoichiometrical proportion is about 1 weight of magnesium to 6 of the oxide. I prefer to use an excess of magnesium, for example about 1 weight to 3 of oxide. Magnesium is itself an active clean-up agent, though it falls far short of the nascent elements of the present invention and may not function to a substantial extent in presence of the latter. The surplus magnesium distills and deposits on the walls of the tube, forming a mirror.

My researches indicate that when the reaction product of a mixture of magnesium and an alkaline earth metal oxide is used to clean up the residual gases, the emissivity of the cathode is improved. A series of tubes prepared with the usual clean-up agents showed an emission of 41.3 milliamperes, while under similar conditions a series of similar tubes in which Mg-BaO mixture has been used gave an average emission of 50.3 milliamperes.

I claim:

1. Process of producing high vacua which comprises liberating by a substantially non gas-forming exothermic reaction in a sealed envelope a metal of the alkaline earth group which in nascent state absorbs the gases present forming solid compounds.

2. Process of producing high vacua which comprises evacuating and sealing an envelope, and then producing a nascent alkaline earth metal in said envelope by a reaction which proceeds without substantial evolution of gas.

3. Process of producing high vacua which comprises evacuating and sealing an envelope, and then producing nascent barium in said envelope by a reaction which proceeds without substantial evolution of gas.

4. Process of producing high vacua which comprises reducing an alkaline earth metal compound with magnesium in a sealed envelope, thereby liberating a metal which in nascent state absorbs the gases present forming solid compounds.

5. Process of producing high vacua which comprises producing nascent barium in a sealed envelope by the interaction of barium oxide and magnesium, the barium being liberated in sufficient quantity to fix all but a trace of the gases present.

6. Process of removing traces of gases from thermionic vacuum tubes which comprises producing in the envelope of the tube a nascent alkaline earth metal by the interaction of its oxide with magnesium, whereby the gases in the envelope are fixed and a high vacuum produced, and the emissivity of the cathode is increased.

In testimony whereof, I affix my signature.

HUGH S. COOPER.